US012115539B2

(12) United States Patent
Xing et al.

(10) Patent No.: US 12,115,539 B2
(45) Date of Patent: Oct. 15, 2024

(54) WIDE-SIZE-FRACTION FLOTATION SYSTEM AND PROCESS

(71) Applicant: CHINA UNIVERSITY OF MINING AND TECHNOLOGY, Jiangsu (CN)

(72) Inventors: Yaowen Xing, Jiangsu (CN); Xiahui Gui, Jiangsu (CN); Shihao Ding, Jiangsu (CN); Mengdi Xu, Jiangsu (CN); Yijun Cao, Jiangsu (CN); Youfei Zhang, Jiangsu (CN); Yangchao Xia, Jiangsu (CN)

(73) Assignee: CHINA UNIVERSITY OF MINING AND TECHNOLOGY (CN)

( * ) Notice: Subject to any disclaimer, the term of this patent is extended or adjusted under 35 U.S.C. 154(b) by 363 days.

(21) Appl. No.: 17/043,600

(22) PCT Filed: Sep. 24, 2019

(86) PCT No.: PCT/CN2019/107441
§ 371 (c)(1),
(2) Date: Sep. 29, 2020

(87) PCT Pub. No.: WO2020/181758
PCT Pub. Date: Sep. 17, 2020

(65) Prior Publication Data

US 2021/0402414 A1 Dec. 30, 2021

(30) Foreign Application Priority Data

Mar. 14, 2019 (CN) ......................... 201910195192.9

(51) Int. Cl.
*B03D 1/02* (2006.01)
*B03B 5/28* (2006.01)
(Continued)

(52) U.S. Cl.
CPC ................ *B03D 1/028* (2013.01); *B03B 5/28* (2013.01); *B03B 7/00* (2013.01); *B03B 9/005* (2013.01); *B03D 1/1418* (2013.01); *B03D 1/24* (2013.01)

(58) Field of Classification Search
None
See application file for complete search history.

(56) References Cited

U.S. PATENT DOCUMENTS 5,346,630 A 9/1994 Kenney ......................... 210/770

FOREIGN PATENT DOCUMENTS

CA 924031 4/1973 ............... B03D 1/02
CN 103041926 4/2013 ............... B03C 1/00
(Continued)

OTHER PUBLICATIONS

International Search Report (with English translation) and Written Opinion issued in PCT/CN2019/106921, dated Dec. 27, 2019, 12 pages.
(Continued)

*Primary Examiner* — Peter Keyworth
(74) *Attorney, Agent, or Firm* — HAYES SOLOWAY P.C.

(57) ABSTRACT

A wide-size-fraction flotation system and process includes feeding coal slime to be floated into a stirrer, adding water to the floating coal slime in the stirrer, stirring, then feeding same into a grading cyclone through a first feeding pump for pre-grading; after grading of the coal slime in the grading cyclone, feeding overflow in the grading cyclone into a flotation column through a second feeding pump for flotation, discharging flotation tailings through an underflow port of the flotation column, collecting flotation concentrates through an overflow port of the flotation column and feeding same into a bubble generator through a fourth feeding pump, and the flotation concentrates passing through the bubble
(Continued)

Figure 1:
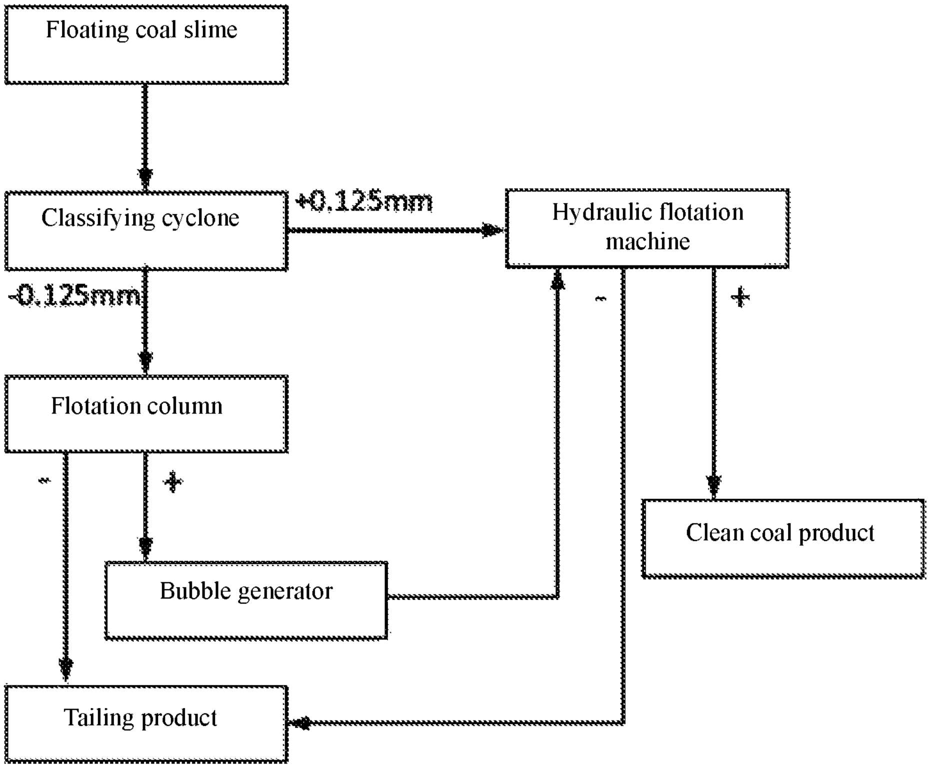

generator and being fed from the bottom of a hydraulic flotation machine; and feeding underflow in the grading cyclone into the hydraulic flotation machine through a third feeding pump, for flotation and recovery.

6 Claims, 1 Drawing Sheet

(51) Int. Cl.

| | |
|---|---|
| ***B03B 7/00*** | (2006.01) |
| ***B03B 9/00*** | (2006.01) |
| ***B03D 1/14*** | (2006.01) |
| ***B03D 1/24*** | (2006.01) |

(56) References Cited

FOREIGN PATENT DOCUMENTS

| | | | |
|---|---|---|---|
| CN | 103240168 | 8/2013 | ............... B03D 1/10 |
| CN | 203916914 | 11/2014 | ............... B03D 1/00 |
| CN | 105127002 | 12/2015 | ............... B03D 1/00 |
| CN | 107952588 | 4/2018 | ............... B03D 1/00 |
| CN | 108970813 | 12/2018 | ............... B03D 1/14 |
| CN | 109046746 | 12/2018 | ............... B03B 7/00 |
| CN | 109365140 | 2/2019 | ............... B03D 1/02 |
| CN | 109731697 | 5/2019 | ............... B03D 1/02 |
| CN | 109759239 | 5/2019 | ............. B03D 1/001 |
| JP | 58-189054 | 11/1983 | ............... B03D 1/02 |
| RU | 079 372 | 5/1997 | ............... B03B 9/00 |

OTHER PUBLICATIONS

International Search Report (with English translation) and Written Opinion issued in PCT/CN2019/107441, dated Dec. 20, 2019, 13 pages.
Xie et al., “Research on Fine Coal Classified Flotation Flow sheet” *Journal of China University of Mining & Technology*, vol. 34, No. 6, Nov. 2005, English abstract, 5 pages.
Xiong et al., “Application of strong bring from coal chemical industry in coal slime water settling” *Clean Coal Technology*, vol. 21, No. 4, Jul. 2015, with machine English translation, 11 pages.

WIDE-SIZE-FRACTION FLOTATION SYSTEM AND PROCESS

I. TECHNICAL FIELD

The present invention relates to the technical field of coal washing and ash removal, in particular to a wide size fraction flotation system and a wide size fraction flotation process.

II. BACKGROUND

China is a country abundant in coal but deficient in oil and gas. Coal will still be a dominant energy resource in China in the future economic development owing to its characteristics of abundance, reliability and economic efficiency. With the deepening of sustainable development, China and the people pay more and more attention to environmental protection in the process of energy use, and more and more respect the use of clean energy. In addition, in China, which is the greatest energy consumer among the countries in the world, with the rapid growth of energy production and consumption, environmental pollution and energy security problems become increasingly prominent. In such a situation, clean and efficient utilization of coal is the key to solve the problems. However, with the rapid improvement of coal mining mechanization level in China, the wide application of dense medium coal preparation technology and the continuous deterioration of coal resource conditions, a large amount of coal slime is produced in the washing and processing process in coal preparation plants, which increases the burden of the coal preparation process.

The conventional slime flotation process has low processing capacity and a narrow selective recovery range of particles. Fine particles in size equal to or smaller than 0.125 mm may be carried by water easily, may entrain fine slime seriously and have poor selectivity, while coarse particles in size greater than 0.25 mm are prone to be desorbed from bubbles and have a low recovery rate. Therefore, it is difficult to realize the wide size fraction flotation.

Faced with the contradiction between the increasing amount of coal slime and the conventional flotation process with limited processing capacity, developing a wide size fraction flotation process with high adaptability and high processing capacity has become a key solution in the process of efficient and clean utilization of coal resources. Through selective separation of fine coal slime by means of a flotation column and efficient recovery of coarse particles by means of a hydraulic flotation machine, the process can realize wide size fraction flotation of coal slime.

III. Summary

In view of the above analysis, the object of the disclosure is to provide a wide size fraction flotation system and a wide size fraction flotation process, so as to solve the problems that the existing wide size fraction flotation process is complex, has high cost and high energy consumption, and is harmful to the environment.

The object of the disclosure is attained mainly with the following:

In one aspect, the disclosure provides a wide size fraction flotation process, which includes the following steps:

step 1: feeding coal slime to be floated into an agitator, adding water into the agitator, agitating and mixing the floating coal slime with the water to a homogeneous state, and feeding the mixture into a classifying cyclone by means of a first feeding pump for pre-classifying;

step 2: after the coal slime is classified in the classifying cyclone, feeding the overflow from the classifying cyclone into a flotation column by means of a second feeding pump for flotation, discharging the flotation tailings through an underflow port of the flotation column, while collecting the flotation concentrate through an overflow port of the flotation column and feeding the collected flotation concentrate into a bubble generator by means of a fourth feeding pump, and feeding the flotation concentrate into a hydraulic flotation machine through the bottom of the hydraulic flotation machine via the bubble generator;

step 3: after the coal slime is classified in the classifying cyclone, feeding the underflow in the classifying cyclone into a hydraulic flotation machine by means of a third feeding pump for recovery by flotation.

Furthermore, in the step 2, when the flotation concentrate passes through the bubble generator, a certain amount of collecting agent and foaming agent are added and supplied to the hydraulic flotation machine as rising water flow of the hydraulic flotation machine to form a foaming layer.

Furthermore, in the step 3, the coarse coal slime underflow fed from the classifying cyclone is separated in the foaming layer in the hydraulic flotation machine, the flotation concentrate is collected through the overflow port of the hydraulic flotation machine, while the flotation tailings are discharged from the underflow port of the hydraulic flotation machine.

Furthermore, the classification accuracy of the classifying cyclone is ±0.125 mm, the size of the particles in the overflow from the classifying cyclone is −0.125 mm, and the size of the particle in the underflow is +0.125 mm.

Furthermore, the foaming agent is one or a combination of pine oil, cresol oil, terpineol (flotation oil 2 #), methyl isobutyl carbinol, methyl amyl alcohol, triethyl-1-alkane (flotation oil 4 #), sodium alkylbenzene sulfonate, alkyl sodium sulfate, polyethylene glycol ether and polyalcohol ether; the collecting agent is one or a combination of kerosene and diesel oil.

In another aspect, the disclosure provides a wide size fraction flotation system used in the wide size fraction flotation process, wherein, an agitator, a classifying cyclone and a flotation device are arranged along a separation pipeline, a first feeding pump is arranged between the agitator and the classifying cyclone, and the flotation device includes a hydraulic flotation machine and a flotation column; the top of the classifying cyclone is provided with a top discharge port, which is connected with the flotation column, and a second feeding pump is arranged between the top discharge port and the flotation column; the bottom of the classifying cyclone is provided with a bottom discharge port, which is connected with the hydraulic flotation machine, and a third feeding pump is arranged between the bottom discharge port and the hydraulic flotation machine.

Furthermore, the flotation column is provided with an underflow port through which the flotation tailings can be discharged and an overflow port for collecting the flotation concentrate; the overflow port is connected with the hydraulic flotation machine, and a bubble generator and a fourth feeding pump for feeding the flotation concentrate into the bubble generator are arranged between the overflow port and the hydraulic flotation machine.

Furthermore, the wide size fraction flotation system is further provided with a feeding device, which supplies the coal slime to be floated into the agitator.

Furthermore, the lower part of the hydraulic flotation machine has a conical structure, and the bubble generator is connected with the upper part of the conical structure.

Furthermore, the top of the flotation column is connected with a washing water pipeline.

Compared with the existing art, the disclosure has at least one of the following beneficial effects:

a) In the wide size fraction flotation process provided by the disclosure, pre-classification is carried out by means of a classifying cyclone, then fine particles are separated by means of a flotation column while coarse particles are separated by means of a hydraulic flotation machine; the concentrate obtained through separation by the flotation column is used as fluidizing water for the hydraulic flotation machine, a stable foaming layer is formed in the hydraulic flotation machine, and the flotation column and the hydraulic flotation machine complement cooperate with and complement to each other, which is more conducive to exert the working performance of the devices, provide a precondition for coarse particle flotation, exert the foaming stabilizing performance of fine particles and save the cost of agents, and is also beneficial for secondary enrichment of the fine particle flotation concentrate, improves the flotation effect, optimizes optimizing the flotation process, expands the processing range of the conventional flotation process, and realizes efficient flotation recovery of fine particles (smaller than 0.125 mm) and coarse particles (0.125 to 1 mm). The process is a simple process, with low cost, low energy consumption and harmless to the environment.

b) The wide size fraction flotation system provided by the disclosure is provided with a classifying cyclone capable of pre-classifying coal slime, the classifying cyclone is respectively connected with a flotation column and a hydraulic flotation machine, and the flotation column that has high selectivity and the hydraulic flotation machine that has high recovery capacity are used cooperatively and complementarily. The wide size fraction flotation system provided by the disclosure has a simple structure, achieves a good flotation effect, has low energy consumption and is environment friendly. It extends the processing limit of the conventional flotation process, realizes efficient flotation recovery of fine particles (smaller than 0.125 mm) and coarse particles (0.125 to 1 mm), and has wide application prospects.

In the disclosure, the above technical solutions may be combined with each other to implement more preferred combined solutions. Other features and advantages of the disclosure will be described in the following specification, and part of advantages will become more obvious from the specification, or will be understood through embodiments of the disclosure. The object and other advantages of the disclosure can be realized and achieved on the basis of the content described in the specification, claims and drawings.

IV. DESCRIPTION OF DRAWINGS

Figure 2:
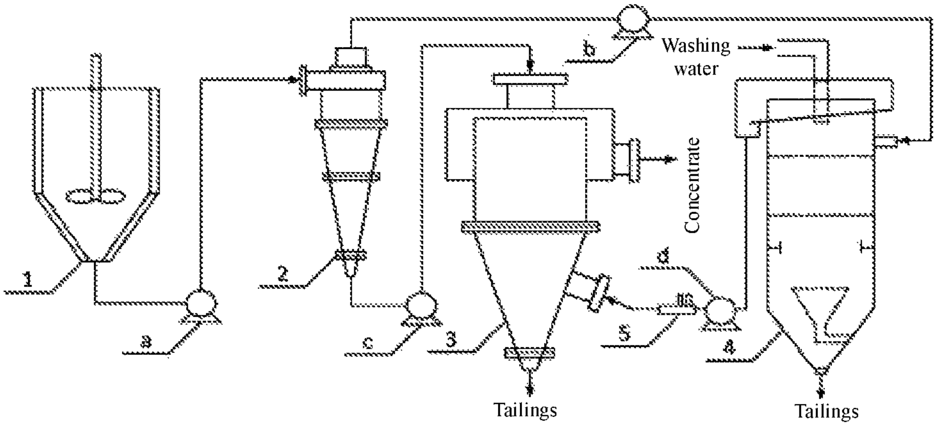

FIG. 1 is a block flow diagram of the separation process in embodiment one of the disclosure; and FIG. 2 is a schematic structural view of the separation device in embodiment two of the disclosure.

In the figures: 1—agitator; 2—classifying cyclone; 3—hydraulic flotation machine; 4—flotation column; 5—bubble generator; a—first feeding pump; b—second feeding pump; c—third feeding pump; d—fourth feeding pump.

V. EMBODIMENTS

Hereunder the embodiments of the disclosure will be further described with reference to the drawings.

Embodiment one: as shown in FIG. 1, a wide size fraction flotation process includes the following steps:

In step one: coal slime to be floated is fed into an agitator 1, water is added into the agitator 1, the floating coal slime is agitated and mixed with the water to a homogeneous state, and then the mixture is fed into a classifying cyclone 2 by means of a first feeding pump a for pre-classifying; preferably, the floating coal slime is classified at 0.125 mm in the classifying cyclone 2, i.e., the classifying accuracy of the classifying cyclone 2 is ±0.125 mm; the size of the particles in the overflow from the classifying cyclone is −0.125 mm, and the size of the particles in the underflow is +0.125 mm.

In step two: after the coal slime is classified in the classifying cyclone 2, the overflow from the classifying cyclone 2 is fed to a flotation column 4 by means of a second feeding pump b for flotation. After the flotation is completed, the flotation tailings are discharged through an underflow port of the flotation column 4, while the flotation concentrate is collected through an overflow port of the flotation column 4 and fed into a bubble generator 5 by means of a fourth feeding pump d, and the flotation concentrate is fed into a hydraulic flotation machine through the bottom via the bubble generator 5. Specifically, the fine coal slime in particle size smaller than 0.125 mm is fed into the flotation column 4 for flotation in precedence, the flotation tailings are discharged through the underflow port of the flotation column 4, while the flotation concentrate is collected through the overflow port of the flotation column 4 and fed into the bubble generator 5 by means of the fourth feeding pump d, so that the fine slime with high ash content in the fine particles is discharged in advance to alleviate the fine slime entrainment problem in the follow-up flotation process.

In step three: after the coal slime is classified in the classifying cyclone 2, the underflow in the classifying cyclone 2 is fed into a hydraulic flotation machine 3 by means of a third feeding pump c for recovery by flotation. Specifically, after the classifying at 0.125 mm in the classifying cyclone 2, large-particle coal slime in particle size greater than 0.125 mm is separated in the foaming layer in the hydraulic flotation machine 3. Owing to the fact that the surfaces of clean coal particles in the large-particle coal slime have high hydrophobicity, the large-particle coal slime collides and contacts with the bubbles in the foaming layer, then adheres to the bubbles, and stays in the foaming layer as concentrate products, which are finally collected through the overflow port of the hydraulic flotation machine 3; owing to the fact that the surfaces of gangue particles in the large-particle coal slime have poor hydrophobicity, the gangue particles do not adhere to the bubbles when passing through the foaming layer, but fall into the underflow as tailings, and finally are discharged through the underflow port of the hydraulic flotation machine 3.

In the step two, based on the ore slurry condition, when the flotation concentrate passes through the bubble generator 5, a certain amount of collecting agent and foaming agent are added and supplied to the hydraulic flotation machine 3 as rising water flow of the hydraulic flotation machine 3 to form a foaming layer with certain depth. Preferably, the foaming agent is one or a combination of pine oil, cresol oil, terpineol (flotation oil 2 #), methyl isobutyl carbinol, methyl amyl alcohol, triethyl-1-alkane (flotation oil 4 #), sodium alkylbenzene sulfonate, alkyl sodium sulfate, polyethylene glycol ether and polyalcohol ether; the collecting agent is one or a combination of kerosene and diesel oil. In this step, the flotation concentrate is fed into the hydraulic flotation machine 3 through the bottom of the hydraulic flotation machine 3 via the bubble generator 5, and a stable foaming layer with a certain depth is formed in the hydraulic flotation machine 3, so as to provide a pre-condition for coarse particle separation on one hand and realize secondary enrichment of fine particle concentrate products on the other hand.

In the step two, the coarse coal slime underflow fed from the grading cyclone 2 is separated in the foaming layer in the hydraulic flotation machine 3, the flotation concentrate is collected through the overflow port of the hydraulic flotation machine 3, while the flotation tailings are discharged from the underflow port of the hydraulic flotation machine 3.

Compared with the existing art, in the wide size fraction flotation process provided in this embodiment, coal slime is classified by means of a classifying cyclone, and the floating coal slime is mixed with water and then pre-classified at 0.125 mm by means of a classifying cyclone; a flotation column 4 and a hydraulic flotation machine 3 are used cooperatively, fine particles are separated by the flotation column, while coarse particles are separated by the hydraulic flotation machine 3, and the concentrate obtained through the separation by the flotation column 4 is used as fluidizing water for the hydraulic flotation machine 3 to form a stable foaming layer in the hydraulic flotation machine 3. The flotation column 4 and the hydraulic flotation machine 3 are used cooperatively and complementarily, so as to provide a condition for coarse particle flotation, exert the foaming stabilizing performance of fine particles, save the cost of agents, and help secondary enrichment of fine particle flotation concentrate, thus improving the flotation effect and optimizing the flotation process. Fine coal slime in −0.125 mm particle size is floated by means of a flotation column 4 in precedence, so as to remove the fine slime with high ash content contained in the fine particles and enhance the selectivity for fine coal slime. The flotation concentrate obtained from the flotation column 4 passes through a bubble generator to form a stable foaming layer in the hydraulic flotation machine to optimize coarse flotation; coarse coal slime in +0.125 mm particle size is floated by the hydraulic flotation machine 3 that has strong recovery ability. By reducing ore slurry turbulence and utilizing the stable foaming layer formed by fine coal slime, the desorption probability in the coarse coal slime flotation process is decreased, and the coarse coal slime recovery ability is enhanced. In summary, the wide size fraction flotation process in the disclosure expands the processing range of the conventional flotation process, realizes efficient flotation recovery of fine particles (smaller than 0.125 mm) and coarse particles (0.125 to 1 mm), and effectively alleviates the problem of fine mud entrainment and coarse particle desorption in the coal slime flotation process. The wide size fraction flotation process in the disclosure is a simple process, with low cost, low energy consumption and harmless to the environment.

Embodiment two: as shown in FIG. 2, a wide size fraction flotation system used in the wide size fraction flotation process, wherein, an agitator 1, a classifying cyclone 2 and a flotation device are arranged along a separation pipeline, a first feeding pump a is arranged between the agitator 1 and the classifying cyclone 2, and the flotation device includes a hydraulic flotation machine 3 and a flotation column 4; the top of the classifying cyclone 2 is provided with a top discharged port, which is connected with the flotation column 4, and a second feeding pump b is arranged between the top discharge port and the flotation column 4; the bottom of the classifying cyclone 2 is provided with a bottom discharge port, which is connected with the hydraulic flotation machine 3, and a third feeding pump c is arranged between the bottom discharge port and the hydraulic flotation machine 3. The flotation column 4 is provided with an underflow port for discharging the flotation tailings and an overflow port for collecting the flotation concentrate; the overflow port is connected with the hydraulic flotation machine 3, and a bubble generator 5 and a fourth feeding pump d for feeding the flotation concentrate into the bubble generator 5 are arranged between the overflow port and the hydraulic flotation machine 3. The flotation column 4 is used to separate the fine coal slime by flotation in precedence, so as to discharge the fine slime with high ash content in advance; thus, the fine slime entrainment problem in the follow-up flotation process is effectively solved, and the flotation selectivity is enhanced. The concentrate separated by the flotation column 4 is used as fluidizing water for the hydraulic flotation machine. Utilizing the foaming stabilizing effect of fine particles, a stable foaming layer is formed in the hydraulic flotation machine 3, which saves the cost of agents, is beneficial to improve the recovery rate of coarse particles and realize secondary enrichment of the fine particle flotation concentrate, and improves the flotation effect of fine particles. In addition, by utilizing the mild flow field environment and stable foaming layer in the hydraulic flotation machine 3 for recovery of the coarse coal slime by flotation, the coarse particle desorption probability is decreased, and the flotation recovery rate is improved.

In this embodiment, the wide size fraction flotation system is further provided with a feeding device, which supplies the coal slime to be floated into the agitator 1. The lower part of the hydraulic flotation machine 3 has a conical structure, and the bubble generator 5 is connected with the upper part of the conical structure. The top of the flotation column 4 is connected with a washing water pipeline.

During implementation, the feeding device supplies coal slime to be floated into the agitator 1, the agitated coal slime is fed into the classifying cyclone 2, the floating coal slime is graded at 0.125 mm in the classifying cyclone 2, fine coal slime in particle size smaller than 0.125 mm is fed into the flotation column 3 for flotation in precedence, while the flotation tailings are discharged through the underflow port of the flotation column 4, the flotation concentrate is collected through the overflow port of the flotation column 4 and fed into the bubble generator 5 by means of the fourth feeding pump d. Thus the fine slime with high ash content in the fine particles is discharged in advance, so as to alleviate the problem of fine slime entrainment in the follow-up flotation process. Based on the ore slurry condition, when the flotation concentrate passes through the bubble generator 5, a certain amount of collecting agent and foaming agent are added and supplied to the hydraulic flotation machine 3 as rising water flow of the hydraulic flotation machine 3 to form a foaming layer with certain depth. After the classifying at 0.125 mm in the classifying cyclone 2, large-particle coal slime in particle size greater than 0.125 mm is fed to the hydraulic flotation machine 3 for recovery by flotation. The large-particle coal slime in particle size greater than 0.125 mm, which is fed from the classifying cyclone 2, is separated in the foaming layer in the hydraulic flotation machine 3, finally the flotation concentrate is collected through the overflow port of the hydraulic flotation machine 3, while the flotation tailings are discharged from the underflow port of the hydraulic flotation machine 3. By utilizing the mild flow field environment and stable foaming layer in the hydraulic flotation machine 3 for recovery of the coarse coal slime by flotation, the flotation system in this embodiment decreases the coarse particle desorption probability and improves the flotation recovery rate.

Compared with the existing art, the wide size fraction flotation system provided in this embodiment is provided with the classifying cyclone 2 to pre-classify the coal slime, the flotation column 4 to fine particles are separated by means of the flotation column 4 and coarse particles are separated by means of the hydraulic flotation machine 3; thus, the size distribution of the feed material in the flotation column 4 and the hydraulic flotation machine 3 is improved so as to further improve the working performance of each device. Besides, the flotation column 4 that has high selectivity and the hydraulic flotation machine 3 that has high recovery capacity are used cooperatively and complementarily, so that the flotation process is optimized to a great extent. When the wide size fraction flotation system provided in this embodiment is used for flotation, the concentrate separated by the flotation column 4 is used as fluidizing water for the hydraulic flotation machine 3 to form a stable foaming layer in the hydraulic flotation machine 3, so as to provide a pre-condition for coarse particle flotation, exert the foaming stabilizing performance of fine particles, save the cost of agents and facilitate secondary enrichment of the fine particle flotation concentrate. Thus, the flotation effect is improved, the processing limit of the conventional flotation process is extended, and efficient flotation and recovery of fine particles (smaller than 0.125 mm) and coarse particles (0.125 to 1 mm) is realized. The wide size fraction flotation system in the disclosure has a simple structure, is energy-saving and environment-friendly, and has wide application prospects.

The invention claimed is:

1. A wide size fraction flotation process for coal washing and ash removal, comprising the following steps:

in step 1: feeding coal slime to be floated into an agitator, adding water into the agitator, agitating and mixing the floating coal slime with the water to a homogeneous state, and feeding the mixture into a classifying cyclone by a first feeding pump for pre-classifying;

in step 2: after the coal slime is classified in the classifying cyclone, feeding the overflow from the classifying cyclone into a flotation column by a second feeding pump for flotation, discharging the flotation tailings through an underflow port of the flotation column, while collecting the flotation concentrate through an overflow port of the flotation column and feeding the collected flotation concentrate into a bubble generator by a fourth feeding pump, and feeding the flotation concentrate into a hydraulic flotation machine through the bottom of the hydraulic flotation machine via the bubble generator; and in step 3: after the coal slime is classified in the classifying cyclone, feeding the underflow in the classifying cyclone into a hydraulic flotation machine by a third feeding pump for recovery by flotation.

2. The wide size fraction flotation process according to claim 1, wherein the foaming agent is one or a combination of pine oil, cresol oil, terpineol, methyl isobutyl carbinol, methyl amyl alcohol, triethyl-1-alkane, sodium alkylbenzene sulfonate, alkyl sodium sulfate, polyethylene glycol ether and polyalcohol ether; and the collecting agent is one or a combination of kerosene and diesel oil.

3. The wide size fraction flotation process according to claim 1, wherein in the step 2, when the flotation concentrate passes through the bubble generator, a certain amount of collecting agent and foaming agent are added and supplied to the hydraulic flotation machine as rising water flow of the hydraulic flotation machine to form a foaming layer.

4. The wide size fraction flotation process according to claim 3, wherein in the step 3, the coarse coal slime underflow fed from the classifying cyclone is separated in the foaming layer in the hydraulic flotation machine, the flotation concentrate is collected through the overflow port of the hydraulic flotation machine, while the flotation tailings are discharged from the underflow port of the hydraulic flotation machine.

5. The wide size fraction flotation process according to claim 3, wherein in the step 3, the coarse coal slime underflow fed from the classifying cyclone is separated in the foaming layer in the hydraulic flotation machine, the flotation concentrate is collected through the overflow port of the hydraulic flotation machine, while the flotation tailings are discharged from the underflow port of the hydraulic flotation machine.

6. The wide size fraction flotation process according to claim 3, wherein the foaming agent is one or a combination of pine oil, cresol oil, terpineol, methyl isobutyl carbinol, methyl amyl alcohol, triethyl-1-alkane, sodium alkylbenzene sulfonate, alkyl sodium sulfate, polyethylene glycol ether and polyalcohol ether;

and the collecting agent is one or a combination of kerosene and diesel oil.

* * * * *